(12) United States Patent
Kozuch et al.

(10) Patent No.: US 8,386,788 B2
(45) Date of Patent: *Feb. 26, 2013

(54) METHOD AND APPARATUS FOR LOADING A TRUSTABLE OPERATING SYSTEM

(75) Inventors: Michael A. Kozuch, Export, PA (US); James A. Sutton, II, Portland, OR (US); David Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/615,475

(22) Filed: Nov. 10, 2009

(65) Prior Publication Data
US 2010/0058075 A1 Mar. 4, 2010

Related U.S. Application Data

(63) Continuation of application No. 10/085,839, filed on Feb. 25, 2002, now Pat. No. 7,631,196.

(51) Int. Cl.
*H04L 29/06* (2006.01)
(52) U.S. Cl. ........................................ 713/176
(58) Field of Classification Search .................. 713/176
See application file for complete search history.

(56) References Cited

U.S. PATENT DOCUMENTS

| | | | |
|---|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,529,870 A | 7/1985 | Chaum |

(Continued)

FOREIGN PATENT DOCUMENTS

| | | |
|---|---|---|
| DE | 4217444 | 12/1992 |
| EP | 0473913 | 3/1992 |

(Continued)

OTHER PUBLICATIONS

"Office Action for U.S. Appl. No. 10/185,123, dated Apr. 16, 2007", 10 pages.

(Continued)

*Primary Examiner* — Jason Gee
(74) *Attorney, Agent, or Firm* — Barre Law Firm, PLLC

(57) ABSTRACT

A method and apparatus is provided for securing a region in a memory of a computer. According to one embodiment, the method comprises halting of all but one of a plurality of processors in a computer. The halted processors entering into a special halted state. Content is loaded into the region only after the halting of all but the one of the plurality of processors and the region is protected from access by the halted processors. The method further comprises placing the non-halted processor into a known privileged state, and causing the halted processors to exit the halted state after the non-halted processor has been placed into the known privileged state.

30 Claims, 6 Drawing Sheets

U.S. PATENT DOCUMENTS

| | | |
|---|---|---|
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,843,541 A | 6/1989 | Bean et al. |
| 4,907,270 A | 3/1990 | Hazard |
| 4,907,272 A | 3/1990 | Hazard |
| 4,910,774 A | 3/1990 | Barakat |
| 4,974,159 A | 11/1990 | Hargrove et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,276,863 A * | 1/1994 | Heider ........................ 709/222 |
| 5,287,363 A | 2/1994 | Wolf et al. |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,488,716 A | 1/1996 | Schneider et al. |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,628,023 A | 5/1997 | Bryant et al. |
| 5,633,929 A | 5/1997 | Kaliski, Jr. |
| 5,657,445 A | 8/1997 | Pearce |
| 5,668,971 A | 9/1997 | Neufeld |
| 5,680,547 A | 10/1997 | Chang |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,815,665 A | 9/1998 | Teper et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,867,658 A * | 2/1999 | Lee ........................ 709/222 |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,422 A | 9/1999 | Angelo et al. |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,978,484 A | 11/1999 | Apperson et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,138,239 A | 10/2000 | Veil |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne et al. |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,298,443 B1 | 10/2001 | Colligan et al. |
| 6,301,646 B1 | 10/2001 | Hostetter |
| 6,307,214 B1 | 10/2001 | Ohtani et al. |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |

| | | | | | | |
|---|---|---|---|---|---|---|
| 6,374,286 | B1 | 4/2002 | Gee et al. | 2004/0193888 A1 | 9/2004 | Wiseman et al. |
| 6,374,317 | B1 | 4/2002 | Ajanovic et al. | 2005/0021968 A1 | 1/2005 | Zimmer et al. |
| 6,378,068 | B1 | 4/2002 | Foster | 2005/0071677 A1 | 3/2005 | Khanna et al. |
| 6,378,072 | B1 | 4/2002 | Collins et al. | 2005/0132202 A1 | 6/2005 | Dillaway et al. |
| 6,389,537 | B1 | 5/2002 | Davis et al. | 2005/0137889 A1 | 6/2005 | Wheeler |
| 6,397,242 | B1 | 5/2002 | Devine et al. | | | |
| 6,397,379 | B1 | 5/2002 | Yates, Jr. et al. | | | |
| 6,412,035 | B1 | 6/2002 | Webber | | | |
| 6,421,702 | B1 | 7/2002 | Gulick | | | |
| 6,435,416 | B1 | 8/2002 | Slassi | | | |
| 6,445,797 | B1 | 9/2002 | McGough et al. | | | |
| 6,463,535 | B1 | 10/2002 | Drews et al. | | | |
| 6,463,537 | B1 | 10/2002 | Tello | | | |
| 6,473,508 | B1 | 10/2002 | Young et al. | | | |
| 6,473,800 | B1 | 10/2002 | Jerger et al. | | | |
| 6,496,847 | B1 | 12/2002 | Bugnion et al. | | | |
| 6,499,123 | B1 | 12/2002 | McFarland et al. | | | |
| 6,505,279 | B1 | 1/2003 | Phillips et al. | | | |
| 6,507,904 | B1 | 1/2003 | Ellison et al. | | | |
| 6,529,909 | B1 | 3/2003 | Bowman-Amuah | | | |
| 6,535,988 | B1 | 3/2003 | Poisner | | | |
| 6,557,104 | B2 | 4/2003 | Vu et al. | | | |
| 6,560,627 | B1 | 5/2003 | McDonald et al. | | | |
| 6,609,199 | B1 | 8/2003 | DeTreville | | | |
| 6,615,278 | B1 | 9/2003 | Curtis | | | |
| 6,633,963 | B1 | 10/2003 | Ellison et al. | | | |
| 6,633,981 | B1 | 10/2003 | Davis | | | |
| 6,651,171 | B1 | 11/2003 | England et al. | | | |
| 6,671,808 | B1 | 12/2003 | Abbott et al. | | | |
| 6,678,825 | B1 | 1/2004 | Ellison et al. | | | |
| 6,684,326 | B1 | 1/2004 | Cromer et al. | | | |
| 6,795,966 | B1 | 9/2004 | Lim et al. | | | |
| 6,804,630 | B2 | 10/2004 | Lee et al. | | | |
| 6,938,164 | B1 * | 8/2005 | England et al. ............... 713/193 | | | |
| 6,988,250 | B1 | 1/2006 | Proudler et al. | | | |
| 6,990,579 | B1 | 1/2006 | Herbert et al. | | | |
| 6,996,710 | B1 | 2/2006 | Ellison et al. | | | |
| 7,013,481 | B1 | 3/2006 | Ellison et al. | | | |
| 7,028,149 | B2 | 4/2006 | Grawrock et al. | | | |
| 7,036,023 | B2 | 4/2006 | Fries et al. | | | |
| 7,103,529 | B2 | 9/2006 | Zimmer | | | |
| 7,103,771 | B2 | 9/2006 | Grawrock | | | |
| 7,133,990 | B2 | 11/2006 | Link et al. | | | |
| 7,165,181 | B2 | 1/2007 | Brickell | | | |
| 7,272,831 | B2 | 9/2007 | Cota-Robles et al. | | | |
| 2001/0021969 | A1 | 9/2001 | Burger et al. | | | |
| 2001/0027511 | A1 | 10/2001 | Wakabayashi et al. | | | |
| 2001/0027527 | A1 | 10/2001 | Khidekel et al. | | | |
| 2001/0037450 | A1 | 11/2001 | Metlitski et al. | | | |
| 2001/0056533 | A1 | 12/2001 | Yianilos et al. | | | |
| 2002/0004900 | A1 | 1/2002 | Patel | | | |
| 2002/0007456 | A1 | 1/2002 | Peinado et al. | | | |
| 2002/0023032 | A1 | 2/2002 | Pearson et al. | | | |
| 2002/0023212 | A1 | 2/2002 | Proudler | | | |
| 2002/0147916 | A1 | 10/2002 | Strongin et al. | | | |
| 2002/0166061 | A1 | 11/2002 | Falik et al. | | | |
| 2002/0169717 | A1 | 11/2002 | Challener | | | |
| 2003/0002668 | A1 | 1/2003 | Graunke et al. | | | |
| 2003/0018892 | A1 | 1/2003 | Tello | | | |
| 2003/0037089 | A1 | 2/2003 | Cota-Robles et al. | | | |
| 2003/0037246 | A1 | 2/2003 | Goodman et al. | | | |
| 2003/0074548 | A1 | 4/2003 | Cromer et al. | | | |
| 2003/0093687 | A1 | 5/2003 | Westhoff et al. | | | |
| 2003/0112008 | A1 | 6/2003 | Hennig | | | |
| 2003/0115453 | A1 | 6/2003 | Grawrock | | | |
| 2003/0126442 | A1 | 7/2003 | Glew et al. | | | |
| 2003/0126453 | A1 | 7/2003 | Glew et al. | | | |
| 2003/0159056 | A1 | 8/2003 | Cromer et al. | | | |
| 2003/0188156 | A1 | 10/2003 | Yasala et al. | | | |
| 2003/0188179 | A1 | 10/2003 | Challener et al. | | | |
| 2003/0196085 | A1 | 10/2003 | Lampson et al. | | | |
| 2003/0226040 | A1 | 12/2003 | Challener et al. | | | |
| 2003/0231328 | A1 | 12/2003 | Chapin et al. | | | |
| 2003/0235175 | A1 | 12/2003 | Naghian et al. | | | |
| 2004/0003324 | A1 | 1/2004 | Uhlig et al. | | | |
| 2004/0025022 | A1 | 2/2004 | Yach et al. | | | |
| 2004/0117539 | A1 | 6/2004 | Bennett et al. | | | |
| 2004/0128345 | A1 | 7/2004 | Robinson et al. | | | |
| 2004/0128670 | A1 | 7/2004 | Robinson et al. | | | |

FOREIGN PATENT DOCUMENTS

| | | |
|---|---|---|
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| FR | 2620248 | 3/1989 |
| FR | 2700430 | 7/1994 |
| FR | 2714780 | 7/1995 |
| FR | 2742618 | 6/1997 |
| FR | 2752122 | 2/1998 |
| FR | 2763452 | 11/1998 |
| FR | 2830147 | 3/2003 |
| IE | IB0021238 | 4/2000 |
| JP | 2000076139 | 3/2000 |
| JP | 200694114 | 4/2006 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9918511 | 4/1999 |
| WO | WO9957863 | 11/1999 |
| WO | WO9965579 | 12/1999 |
| WO | 00/10283 A1 | 2/2000 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO9909482 | 1/2002 |
| WO | 02/15021 A1 | 2/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |
| WO | 03/073269 A2 | 9/2003 |
| WO | 03/073269 A3 | 9/2004 |

OTHER PUBLICATIONS

"Office Action for U.S. Appl. No. 10/663,206, dated Apr. 19, 2007".
"Office Action for U.S. Appl. No. 10/814,569, dated Apr. 5, 2007", 5 pages.
"PCT Search Report for PCT/US2005/010156, dated Aug. 22, 2006", 6 pages.
"PCT/US2004/007040 Search Report", (Mar. 14, 2005), 8 pages.
Ateniese, Giuseppe , et al., "A Practical and Provably Secure Coalition-Resistant Group Signature Scheme", *Advances in Cryptology—CRYPTO2000, vol. 1880 of Lecture Notes in Computer Science*, Int'; Assoc for Crypt Res, Spring-Verlag, Berlin, Germany, (2000), 255-270.
Berg, Cliff , "How Do I Create a Signed Applet?", *Dr. Dobb's Journal*, (Aug. 1997), 1-9.
Brands, Stefan , "Restrictive Blinding of Secret-Key Certificates", *Springer-Verlag XP002201306*, (1995), Chapter 3.
Carvalho, "Subject Domain Organisation and Teaching Strategy for Distance Learning in the UnB Virtual Project", 2002 IEEE, Retrieved from Internet: http://lttf.ieee.org/icalt2002/proceedings/t803_icalt042_End.pdf 2002, IEEE, pp. 327-330 (4 pages).

Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999), 209-221.

Compaq Computer Corporation, "Trusted Computing Platform Alliance (TCPA) Main Specification Version 1.1a", XP002272822, (Jan. 25, 2001), 1-321.

Coulouris, George, et al., "Distributed Systems, Concepts and Designs", *2nd Edition*, (1994), 422-424.

Crawford, John, "Architecture of the Intel 80386", *Proceedings of the IEEE International Conference on Computer Design: VLSI in Computers and Processors* (ICCD '86), (Oct. 6, 1986), 155-160.

Davida, George I., et al., "Defending Systems Against Viruses through Cryptographic Authentcation", *Proceedings of the Symposium on Security and Privacy*, IEEE Comp. Soc. Press, ISBN 0-8186-1939-2, (May 1989).

Fabry, R.S., "Capability-Based Addressing", Fabry, R.S., "Capability-Based Addressing," *Communications of the ACM*, vol. 17, No. 7, (Jul. 1974), 403-412.

Frieder, Gideon, "The Architecture and Operational Characteristics of the VMX Host Machine", *The Architecture and Operational Characteristics of the VMX Host Machine, IEEE*, (1982), 9-16.

Goldberg, Robert P., "Survey of Virtual Machine Research", *Computer Magazine*, (Jun. 1974), 34-45.

Gong, Li, et al., "Going Behond the Sandbox: An Overview of the New Security Architecture in the Java Development Kit 1.2", *Proceedings of the USENIX Symposium on Internet Technologies and Systems*, Monterey, CA, (Dec. 1997).

Gum, P. H., "System/370 Extended Architecture: Facilities for Virtual Machines", *IBM J. Research Development*, vol. 27, No. 6, (Nov. 1983), 530-544.

Hall, Judith S., et al., "Virtualizing the VAX Architecture", *ACM SIGARCH Computer Architecture News, Proceedings of the 18th Annual International Symposium on Computer Architecture*, vol. 19, Issue No. 3, (Apr. 1991), 10 pages.

Heinrich, Joe, "MIPS R4000 Microprocessor User's Manual, Second Edition", Chapter 4 "Memory Management", (Jun. 11, 1993), 61-97.

HP Mobile Security Overview, "HP Mobile Security Overview", (Sep. 2002), 1-10.

IBM, "Information Display Technique for a Terminate Stay Resident Program IBM Technical Disclosure Bulletin", TDB-ACC-No. NA9112156, vol. 34, Issue 7A, (Dec. 1, 1991), 156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004, (Jul. 2, 2002), 1-6.

Intel Corporation, "IA-32 Intel Architecture Software Developer'Manual", *vol. 3: System Programming Guide*, Intel Corporation—2003, 13-1 through 13-24.

Intel Corporation, "IA-64 System Abstraction Layer Specification", *Intel Product Specification*, Order No. 245359-001, (Jan. 2000), 1-112.

Intel Corporation, "Intel 82802AB/82802AC Firmware Hub (FWH)", *Intel Product Datasheet*, Document No. 290658-004, (Nov. 2000), 1-6, 17-28.

Intel Coporation, "Intel IA-64 Architecture Software Developer's Manual", *vol. 2: IA-64 System Architecture*, Order No. 245318-001, (Jan. 2000), i, ii, 5.1-5.3, 11.1-11.8, 11.23-11.26.

Intel Corporation, "Intel386 DX Microprocessor 32-Bit CHMOS Microprocessor With Integrated Memory Management", (1995), 5-56.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990), 2-19.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8, (1996).

Lawton, Kevin, et al., "Running Multiple Operating Systems Concurrently on an IA32 PC Using Virtualization Techniques", http://www.plex86.org/research/paper.txt, (Nov. 29, 1999), 1-31.

Luke, Jahn, et al., "Replacement Strategy for Aging Avionics Computers", *IEEE AES Systems Magazine*, XP002190614, (Mar. 1999).

Menezes, Alfred J., et al., "Handbook of Applied Cyptography", *CRC Press Series on Discrete Mathematics and its Applications*, Boca Raton, FL, XP0022165287, ISBN 0849385237, (Oct. 1996), 403-405, 506-515, 570.

Menezes, Alfred J., et al., "Handbook of Applied Cryptography", *CRC Press LLC, USA*, (1997), 22, 28-30.

Micciancio, Daniele, et al., "Efficient and COncurrent Zero-Knowledge from any public coin HVZK protocol", Retrieved from the Internet on Sep. 2, 2004: URL:http://eprint.iarc.org/2002/090.pdf>; XP-002313884; 20 pages; published Jul. 8, 2002, 20 pages.

Motorola, "M68040 user's Manual", (1993), 1-1 to 8-32.

Nanba, S., et al., "VM/4: ACOS-4 Virtual Machine Architecture", *VM/4: ACOS-4 Virtual Machine Architecture, IEEE*, (1985), 171-178.

P16436PCT, *PCT Search Report & Written Opinion* mailed Mar. 14, 2005 for PCT Application No. PCT/US2004/007040, 23 pages.

Prabhakaran, Manoj, et al., "Concurrent Zero Knowledge Proffs with Logarithimic Round-Complexity", Retrieved from the Internet on Sep. 22, 2004: URL:http://eprint.iacr.org/2002/055.pdf>; XP002313883; Published on May 6, 2002; 20 pages.

Richt, Stefan, et al., "In-Circuit-Emulator Wird Echtzeittauglich", *Elektronic, Franzis Verlag GMBH*, Munchen, DE, vol. 40, No. 16, XP000259620, (Aug. 6, 1991), 100-103.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000), 1-17.

Rosenberg, Jonathan B., "How Debuggers Work (Algorithms, Data Structures, and Architecture", *Chapters 3 and 5 Hardware Debugger Facilities, Wiley Computer Publishing*, United States, (1996), pp. 42-43, 95, 96 and 99.

Rosenblum, M., "Virtual Platform: A Virtual Machine Monitor for Commodity PC", *Proceedings of the 11th Hotchips Conference*, (Aug. 17, 1999), 185-196.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio, et al., "A Hardware Scheduler for Complex Real-Time Systems", *Proceedings of the IEEE International Symposium on Industrial Electronics*, XP002190615, (Jul. 1999), 43-48.

Schneier, Bruce, "Applied Cryptography: Protocols, Algorithm, and Source Code in C", *Wiley, John & Sons, Inc.*, XP002939871; ISBN 0471117099, (Oct. 1995), 47-52.

Schneier, Bruce, "Applied Cryptography: Protocols, Algorithm, and Source Code in C", *Wiley, John & Sons, Inc.*, XP002138607; ISBN 0471117099, (Oct. 1995), 56-65.

Schneier, Bruce, "Applied Cryptography: Protocols, Code C", *Wiley, John & Sons, Inc.*, XP0021111449; Algorithms, and Source ISBN 0471117099, (Oct. 1995), 169-187.

Schneier, Bruce, "Applied Cryptography: Protocols, Algorithms, and Source Code in C", *2nd Edition: Wiley, John & Sons, Inc.*, XP002251738; ISBN 0471128457, (Nov. 1995), 28-33; 176-177; 216-217; 461-473; 518-522.

Sherwood, Timothy, et al., "Patchable Instruction ROM Architecture", *Department of Computer Science and Engineering*, University of California, San Diego, La Jolla, CA, (Nov. 2001).

Tung, Brian, "The Moron's Guide to Kerberos, Version 1.2.2", Published Dec. 2006; Retrieved from the Internet on Oct. 4, 2006; http://www/web.archive.org/web/20000815233731/http://www.is.edu/~brian/security/kerberos.html.; 11 pages.

Wenisch, Thomas F., et al., "Store-Ordered Streaming of Shared Memory", *Proceedings of the 14th Int'l Conference on Parallel Architecture and Compilation Techniques(PACT '05)* Sep. 2005, IEEE, pp. 75-84, (2005), 10 pages.

Zemor, Gilles, "Cours de Crytography", Published Nov. 2000; Cassinni, Paris, ISBN 2-844225-020-6; XP002313885; pp. 165-173.
Written Opinion for PCT International Application No. PCT/US03/04612 mailed Sep. 10, 2004; 6 pages.
Examination Report issued for United Kingdom Patent Application No. GB0419314.0 mailed on Dec. 20, 2004; 3 pages.
International Preliminary Examination Report received for PCT Application No. PCT/US2003/04612, mailed on Oct. 28, 2004, 7 pages.
Dyer et al., "Building the IBM 4758 Secure Coprocessor", Computer, IEEE, vol. 34, Issue 10, Oct. 2001, pp. 57-66.
Schneier, "Applied Cryptography - Protocols, Algorithms, and Source Code in C". Second Edition. John Wiley & Sons, Inc. 1996. pp. 38-39.
Tetrault, ATPM—Review: Virtual PC 4.0. Apr. 2001.
Office Action received for U.S. Appl. No. 10/085,839, mailed on Mar. 7, 2006.
Office Action received for U.S. Appl. No. 10/085,839, mailed on Jan. 26, 2007.
Office Action received for U.S. Appl. No. 10/085,839, mailed on Nov. 26, 2007.
Infineon Technologies, "TriCore 32-bit Unified Processor DSP Optimization Guide Part 2: Routines", User Guide, v1.6.4, Jan. 2003, pp. 22-25 and 98-101.
Office Action received for German Patent Application No. 10392320.9, mailed on Jan. 17, 2007; 3 pages of Office Action and 2 pages of English Translation.
Office Action received for German Patent Application No. 10392320.9, mailed on Jul. 9, 2008; 1 page of English Translation only.
Office Action received for German Patent Application No. 10392320.9, mailed on Aug. 31, 2009. 3 pages of Office Action and 4 pages of English Translation.
Office Action received for German Patent Application No. 10392320.9, mailed on Dec. 1, 2005. 5 pages of Office Action and 5 pages of English Translation.
Notice of Allowance received for U.S. Appl. No. 10/085,839, mailed on Jul. 23, 2009, 8 pages.
Office Action received for U.S. Appl. No. 10/085,839, mailed on Feb. 25, 2009, 18 pages.
Office Action received for U.S. Appl. No. 10/085,839, mailed on May 21, 2008, 20 pages.
Office Action received for U.S. Appl. No. 10/085,839, mailed on Oct. 24, 2008, 19 pages.
Office Action received for U.S. Appl. No. 10/085,839, mailed on Sep. 1, 2006, 18 pages.
Advisory Action received for U.S. Appl. No. 12/615,519, mailed on Jul. 2, 2012, 4 pages.
Office Action received for U.S. Appl. No. 12/615,519, mailed on Apr. 11, 2012, 18 pages.
Office Action received for U.S. Appl. No. 12/615,519, mailed on Aug. 3, 2012, 12 pages.
Office Action received for U.S. Appl. No. 12/615,519, mailed on Mar. 24, 2011, 16 pages.
Office Action received for U.S. Appl. No. 12/615,519, mailed on Nov. 29, 2011, 14 pages.
Office Action received for U.S. Appl. No. 12/615,519, mailed on Sep. 23, 2010, 22 pages.

* cited by examiner

METHOD AND APPARATUS FOR LOADING A TRUSTABLE OPERATING SYSTEM

CROSS-REFERENCE TO RELATED APPLICATIONS

This application is a Continuation of U.S. patent application Ser. No. 10/085,839 filed Feb. 25, 2002, now U.S. Pat. No. 7,631,196, the entire contents of which are incorporated herein by reference.

FIELD OF THE INVENTION

This invention relates to microprocessors. In particular, the invention relates to processor security.

BACKGROUND

Advances in microprocessor and communication technologies have opened up many opportunities for applications that go beyond the traditional ways of doing business. Electronic commerce and business-to-business transactions are now becoming popular, reaching the global markets at a fast rate. Unfortunately, while modern microprocessor systems provide users convenient and efficient methods of doing business, communicating and transacting, they are also vulnerable to unscrupulous attacks. Examples of these attacks include virus, intrusion, security breach, and tampering, to name a few. Computer security, therefore, is becoming more and more important to protect the integrity of the computer systems and increase the trust of users.

In the context of operating systems, computer security is determined initially by establishing that you are loading (or have loaded) a trustable operating system. A trustable operating system is where the user or a third party may later inspect the system and determine whether a given operating system was loaded, and if so, whether or not the system was loaded into a secure environment.

However, when booting a normal operating system it is necessary to boot a wide variety of code components. Even if you could choose what code component should be loaded, the operating system contains such an extremely large amount of code that it is difficult to establish the operating system's specific identity and whether you should choose to trust it, i.e. whether it was loaded into a secure environment.

In a multi-processor environment, it may be particularly difficult to determine whether the operating system can be trusted. This is because each of the central processing units (CPUs), or sometimes even a system device, can execute a code stream that can potentially alter and compromise the integrity of the code that was loaded. Consequently, at least at the operating system level, it is often necessary to assume that the operating system is trustworthy. Such assumptions may prove to be false and can lead to catastrophic failures in computer security.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description various aspects of the present invention, a method and apparatus for loading a trustable operating system, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention.

Parts of the description will be presented using terminology commonly employed by those skilled in the art to convey the substance of their work to others skilled in the art, including terms of operations performed by a computer system and their operands, such as transmitting, receiving, retrieving, determining, generating, recording, storing, and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
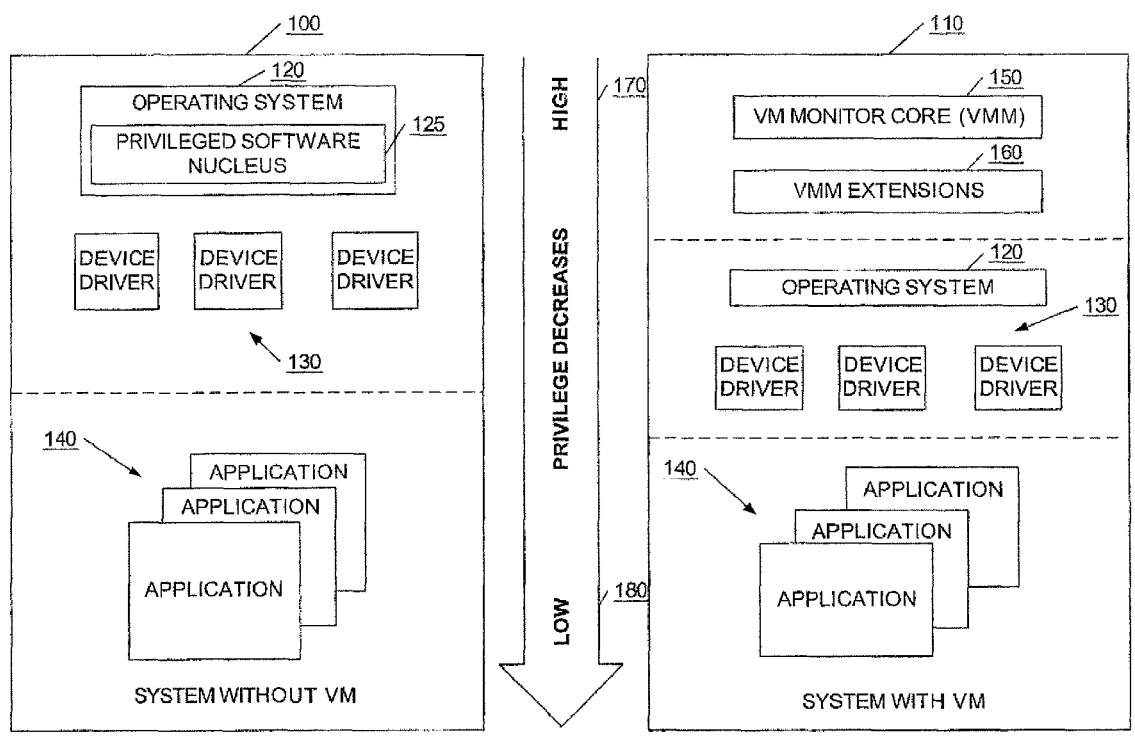
FIG. 1 is a diagram illustrating a generalized overview of the organization of typical operating system components and corresponding privilege levels.

One principle for providing security in a computer system or platform is the concept of enforcing privilege levels. Privilege levels restrict which system resources (e.g. privileged instructions, memory, input/output devices and the like) that a particular software component can access. FIG. 1 is a diagram illustrating a generalized overview of the organization of typical operating system components and corresponding privilege levels. In a system without virtual-machine (VM) technology 100, the operating system 120 includes a small resident program component called a privileged software nucleus 125 that operates with the highest privilege level 170, i.e. the privileged software nucleus 125 can execute both privileged and non-privileged instructions and access memory and I/O devices. Another type of system component, the device drivers 130, also execute with a high privilege level 170, particularly if the system supports direct memory access (DMA) transactions, in which a device driver 130 may write the contents of its device directly to memory without involving a processor (e.g. without using the privileged software nucleus 125 to access memory). Still other types of system components, such as the applications 140, operate with a lower privilege level 180 and are only able to execute non-privileged or lesser-privileged instructions or to make supervisory calls (SVCs) to the privileged software nucleus 125 in the operating system 120 to execute the privileged instructions or, more generally, to access privileged system resources on behalf of the application 140.

In a system with VM technology 110, another type of system component executes with the highest privilege: the virtual-machine monitor (VMM) 150. In a VM system 110, the operating system 120 actually executes with less privilege than the VMM 150. In some VMM implementations, the VMM 150 may be broken into a VMM core component 150 and one or more VMM extensions 160 that execute with less privilege than the VMM core component 150 but more than the operating system 120. In this way, the VMM core component 150 maintains its integrity in the presence of faulty VMM extensions 160.

Figure 2:
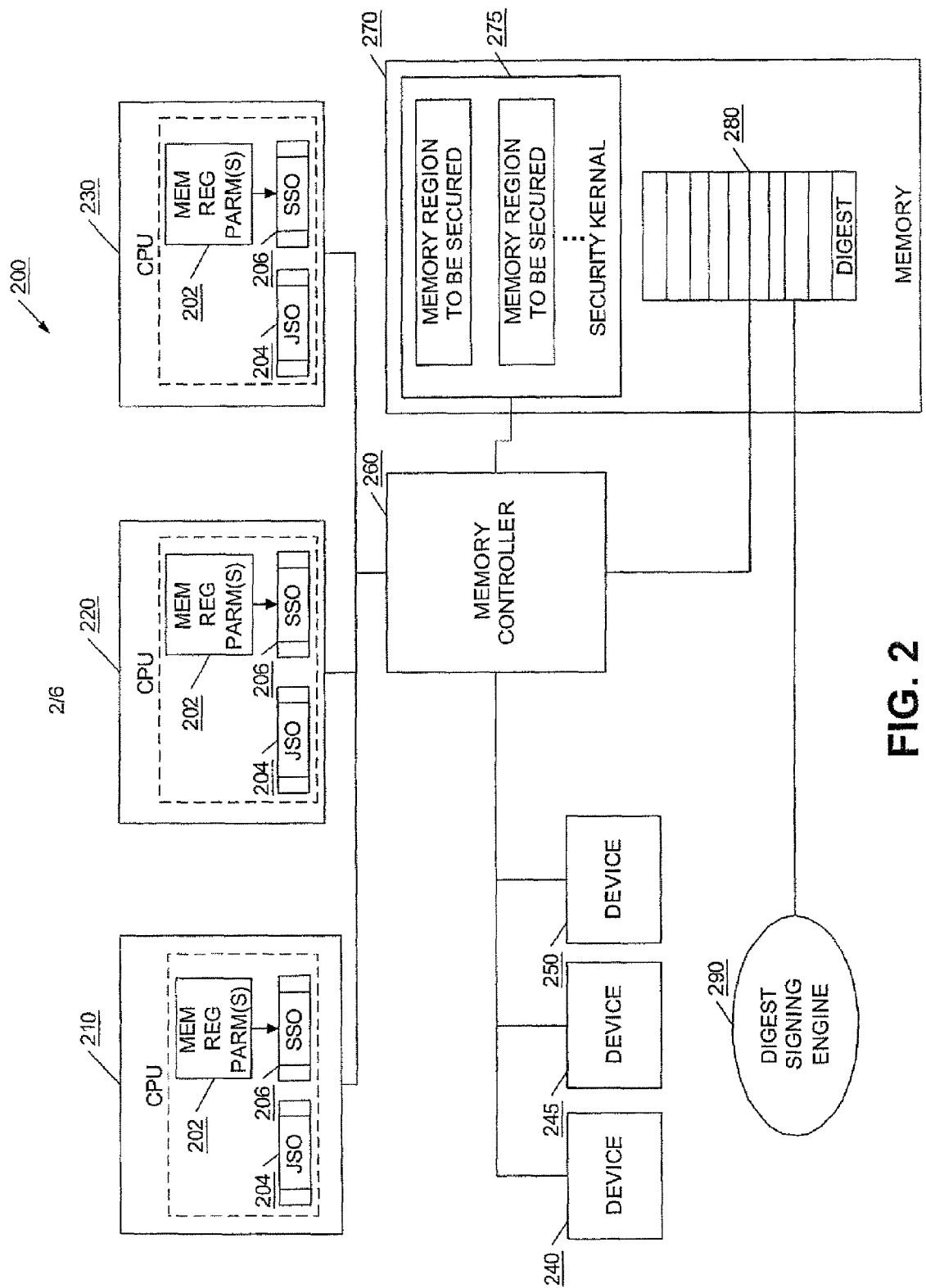
FIG. 2 is a block diagram illustrating one generalized embodiment of a computer system incorporating the invention, and in which certain aspects of the invention may be practiced.

FIG. 2 is a block diagram illustrating one generalized embodiment of a computer system 200 incorporating the invention, and in which certain aspects of the invention may be practiced. It should be understood that the distinction between the various components of computer system 200 is a logical distinction only; in practice, any of the components may be integrated into the same silicon die, divided into multiple die, or a combination of both, without departing from the scope of the invention. In the illustrated computer system 200, either the central processing units (CPU) 210/220/230 or the devices 240/245/250 have the necessary high privilege levels 170 that enable them to initiate transactions in memory 270. The memory controller 260 is responsible for forwarding the memory transaction from memory 270 to the appropriate destination.

The computer system 200 further includes a hash digest 280 of cryptographic hash values that identify the contents of one or more operating system components that have been loaded into regions in memory 270. It is noted that a cryptographic hash value is known in the art as being generated by a one-way function, mathematical or otherwise, which takes a variable-length input string, called a pre-image and converts it to a fixed-length, generally smaller, output string referred to as a hash value. The hash function is one-way in that it is difficult to generate a pre-image that matches the hash value of another pre-image. A hash digest signing engine 290 has a secure channel to access the hash digest 280 and will sign the contents of the hash digest 280 upon receiving a request to do so. Signing the contents of a hash digest 280 is known in the art, and is used to produce a digital signature that can be later used to authenticate the identity of the signer and to ensure that the content of the hash digest 280 has not been tampered with. By requesting such a signing, an outside entity may observe the state of system components reported by the hash and decide whether or not to trust the computer system 200, i.e. whether or not the signed contents of the hash digest 280 match the expected signature of the system components.

In order to insure that the state of the components reported by the hash are such that the computer system 200 can be trusted, each of the computer system's CPUs 210/220/230 incorporate or is capable of incorporating an embodiment of the method and apparatus of the present invention to facilitate the installation (or loading) of a trustable operating system.

In one embodiment, the method and apparatus of the present invention include a start secure operation (SSO) 206 and a join secure operation (JSO) 204, each of which are capable of operating on any of the computer system's CPUs 210/220/230. The SSO 206 and JSO 204 are logical operations that are performed atomically to insure the integrity of the computer system 200. The SSO 206 and JSO 204 may be implemented as a series of privileged instructions carried out in software, hardware, or a combination thereof without departing from the scope of the invention.

In one embodiment, the SSO 206 takes a region (or regions) of memory 270 that was specified in a memory region parameter 202 and causes the computer system 200 to perform a number of operations that enable one of the CPUs 210/220/230 to load and register one or more components of operating system code in the specified region of memory 270 while the JSO 204 prevents the other CPUs from interfering. Upon the loading of the one or more operating system components, the JSO 204 and SSO 206 further force the CPUs 210/220/230 to jump to a known entry point in the now secured specified region of memory 270, also referred to as a security kernel 275, in a known, privileged state, i.e. a known state that allows access to the computer system's 200 resources in accordance with the CPU's corresponding high privilege level 170.

In one embodiment, once the region or regions in memory 270 to be secured is identified, via memory region parameter 202 or otherwise, the SSO 206 places the code that is to be secured into the identified region in memory 270, i.e. places the operating system code (or a portion thereof) into the security kernel 275. The code may be any code that is desired to be trusted, such as the privileged software nucleus 125 of the operating system 120 or, in a system with VM 110, the VMM core 150, the VM monitor core code.

In one embodiment, once the code is placed in the security kernel 275, the SSO 206 securely launches the operating system by registering the identity of the operating system code, e.g. the privileged software nucleus 125 or the VMM core 150. The SSO 206 registers the identity of the code by computing and recording a hash digest 180 of the code, and cryptographically signing the hash digest 180 using the hash digest signing engine 290. Once registered, the operating system becomes a trustable operating system, capable of verification by an outside entity.

In a computer system 200 with more than one CPU, as illustrated in FIG. 2, the computer system 200 must also be capable of preventing CPUs 220/230, other than the CPU 210 executing the SSO 206, from interfering with the secure launch of the trustable operating system. Accordingly, each CPU 210/220/230 is further provided with a JSO 204. When an SSO 206 is initiated on CPU 210, the SSO 206 signals the other CPUs 220/230 to execute a JSO 204.

In one embodiment, the JSO 204 forces the respective CPUs 220/230 to enter a special halted state and to signal their entry into the halted state to the initiating SSO CPU 210. When the initiating SSO CPU 210 receives halted signals from all of the other CPUs 220/230, the SSO 206 commences loading a trustable operating system by placing the desired code in the security kernel 275 and registering it. Once the CPU 210 that initiated the SSO 206 completes loading the trustable operating system, i.e. when the identity of the code in the security kernel 275 has been registered, the SSO 206 forces the CPU 210 to jump to a known entry point in the security kernel 275, which now has a known privileged state as a result of the operation of the SSO 206. In addition, the SSO 206 signals the other CPUs 220/230 to exit their respective special halted states. Upon exiting the halted states, the JSO 204 forces the CPUs 220/230 to also jump to a known entry point in the security kernel 275.

In one embodiment, the memory region parameter 202 is specified as a range of addresses in memory 270, and includes one or more pairs of start and stop addresses. However, other ways of specifying which region or regions in memory 270 are to be secured may be employed without departing from the scope of the invention. For example, an alternate embodiment of the memory region parameter 202 may be specified as a starting address and region length.

Figure 3:
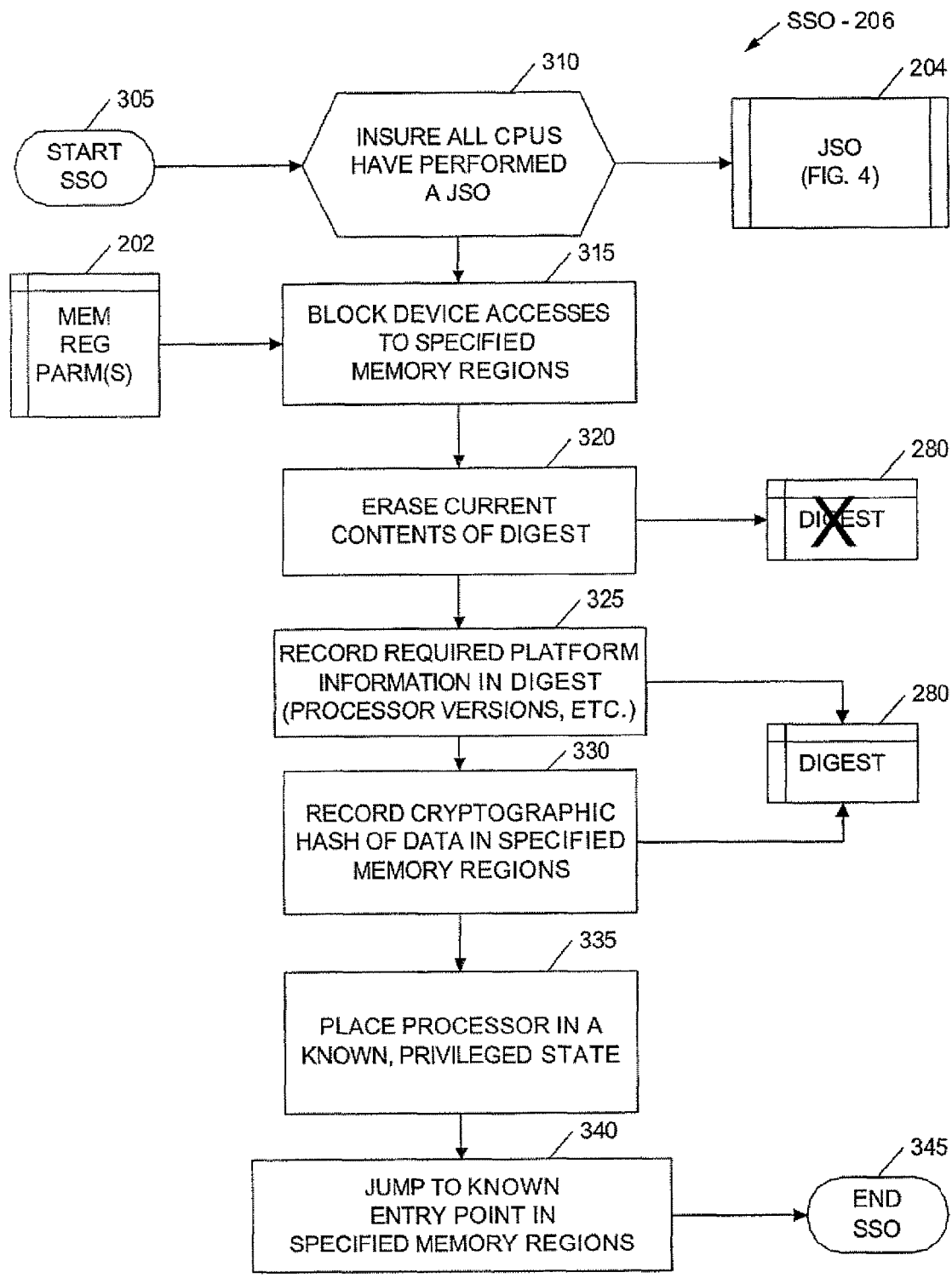
FIG. 3 is a flow diagram illustrating certain aspects of a method to be performed by a computing device executing one embodiment of the illustrated invention shown in FIG. 2.
Figure 4:
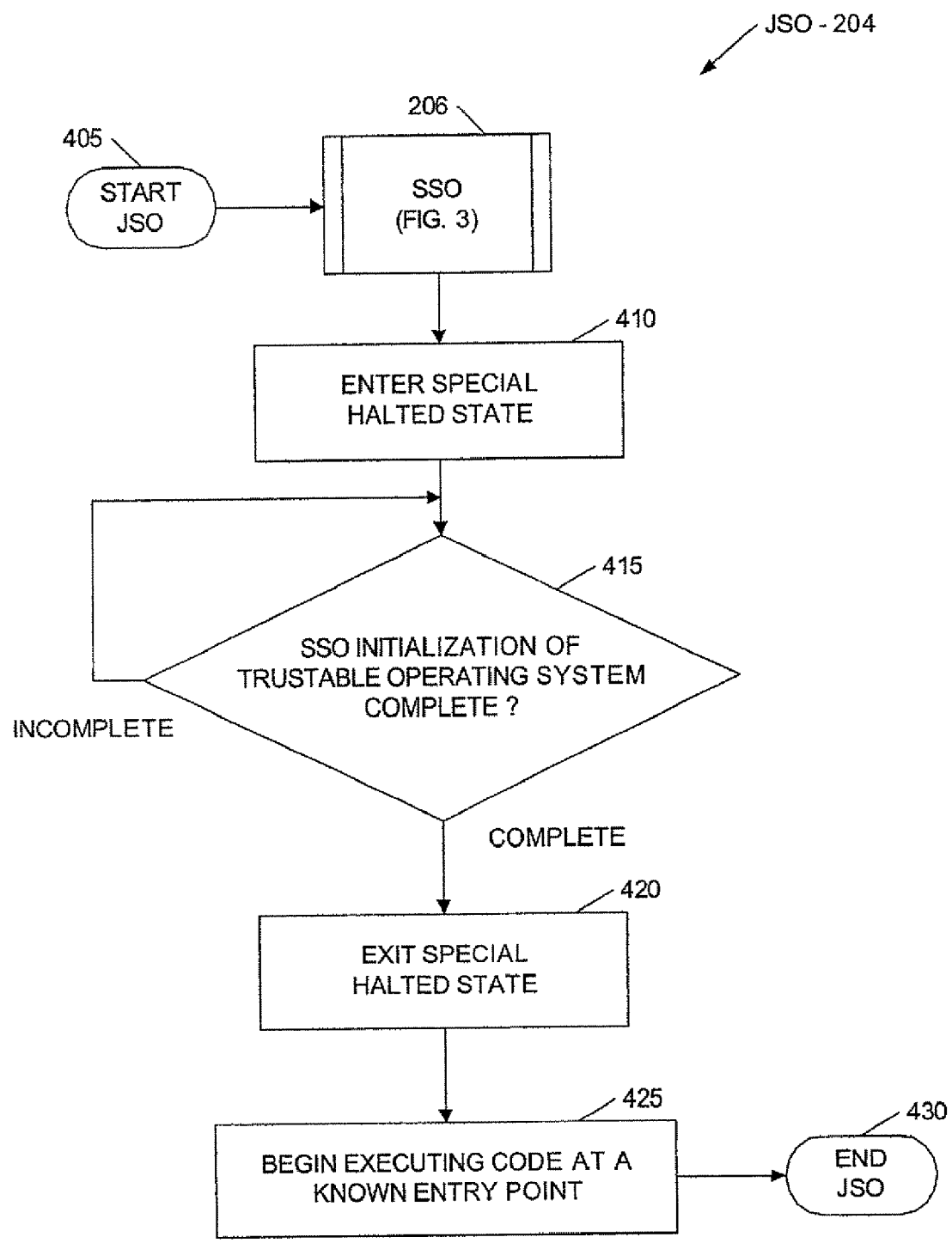
FIG. 4 is a flow diagram illustrating certain other aspects of a method to be performed by a computing device executing one embodiment of the illustrated invention shown in FIG. 2.
Figure 5:
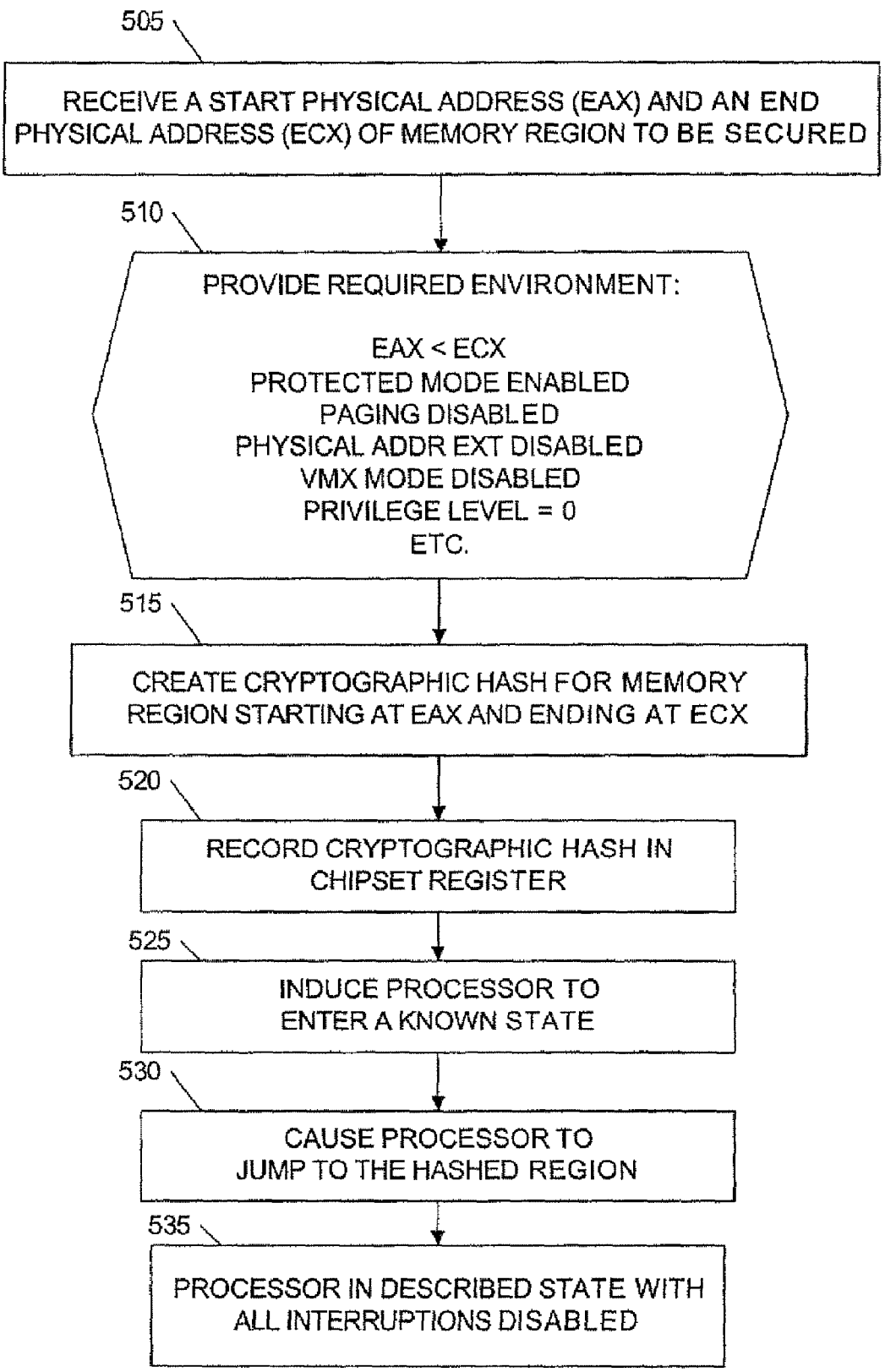
FIG. 5 is a flow diagram illustrating certain aspects of a method to be performed by a computing device executing another embodiment of the illustrated invention shown in FIG. 2.

Turning now to FIGS. 3-5, the particular methods of the invention are described in terms of computer software with reference to a series of flow diagrams. The methods to be performed by a computer constitute computer programs made up of computer-executable instructions. Describing the methods by reference to a flow diagram enables one skilled in the art to develop such programs including such instructions to carry out the methods on suitably configured computers (the processor of the computer executing the instructions from computer-accessible media). The computer-executable instructions may be written in a computer programming language or may be embodied in firmware logic, or in micro-engine code, or the like. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, and the like), as taking an action or causing a result. Such expressions are merely a shorthand way of saying that execution of the software by a computer causes the processor of the computer to perform an action or produce a result.

FIG. 3 is a flow diagram illustrating certain aspects of a method to be performed by a computing device executing one embodiment of the illustrated invention shown in FIG. 2. In particular, FIG. 3 illustrates some of the acts to be performed by a computer executing an SSO 206 that incorporates one embodiment of the invention. Processing begins at process 305, where one of the CPUs of computer system 200, for example CPU 210, prepares for executing an SSO 206 by insuring at process 310 that all of the other CPUs 220/230 of computer system 200 have performed a JSO 204. The JSO 204 causes the other CPUs 220/230 of computer system 200 to enter a halted state so that they cannot interfere with the SSO 206 and CPU 210 during the loading of the trustable operating system. In one embodiment, after all of the other CPUs 220/230 have been halted, the SSO 206 continues at process 315 to cause the CPU 210, or in some cases, the memory controller 260, to block the devices 240/245/250 of computer system 200 from accessing regions in memory 270 specified in memory region parameters 202, i.e. the security kernel 275. Blocking devices from accessing the security kernel 275 for the duration of the SSO 206 is typically only necessary in a computer system 200 that supports direct memory access (DMA). In one embodiment, blocking devices from accessing the security kernel 275 may also be performed by a standard chipset.

In one embodiment, at process 320, the SSO 206 erases the current contents of the hash digest 280 in preparation for recording current platform and hash digest information. At process 325, the SSO 206 records the platform information in the hash digest 280. The recording of platform information may or may not be necessary, depending on the architecture of the computer system 200, and can include the version number of the CPU 210 executing the SSO 206, and the like. At process 330, the SSO 206 further computes a cryptographic hash digest of the code now present in the security kernel 275, i.e. the privileged software nucleus 125 or VMM core 150. The SSO 206 further records the information, also in the hash digest 280. At process 335, upon recording the necessary information in the hash digest 280, the SSO 206 places the CPU 210 into a known privileged state. Once the CPU 210 is in the known privileged state, the SSO 206 can further force the CPU 210 to jump to a known entry point in the security kernel 275. The known entry point may be any addressable area of the security kernel 275. Once the CPU 210 has jumped to the known entry point, the SSO 206 is complete and signals the other CPUs 220/230 to resume activity and returns control to the CPU 210.

Upon completion of SSO 206, an outside entity may send a request to the hash digest signing engine 290 to activate a secure channel to access the hash digest 280 and cause the digest signing engine 290 to read and cryptographically sign the content of the digest 280 recorded by the SSO 206. As noted earlier, by requesting such a signing, the outside entity may observe the state of components reported by the hash and decide whether or not to trust the computer system 200, i.e. whether or not a trustable operating system has been loaded.

FIG. 4 is a flow diagram illustrating certain aspects of a method to be performed by a computing device executing one embodiment of the illustrated invention shown in FIG. 2. In particular, FIG. 4 illustrates some of the acts to be performed by a computer executing a JSO 204 that incorporates one embodiment of the invention. Processing begins at process 405, where each of the computer system's 200 non-SSO CPUs, for example CPUs 220/230, enter a special halted state in response to the actions of the SSO 206 on CPU 210. The halted state prevents the CPUs 220/230 from interfering with the SSO 206 and CPU 210 during the loading of the trustable operating system. The CPUs 220/230 each signal the SSO 206 on CPU 210 as they enter the halted state. The JSO 204 continues at decision process 415, which waits until receiving a signal that the SSO 206 on CPU 210 has completed the initialization of a trustable operating system. Once the initialization is complete the JSO 204 continues at process 420 causing the CPUs 220/230 to exit the special halted state. At process 425, the JSO 204 causes the CPUs 220/230 to jump to a known entry point in the security kernel 275, after which the JSO 204 completes processing at termination 430 and returns control to the respective CPUs 220/230.

While FIGS. 3-4 describe a generalized embodiment of the SSO 206 and JSO 204 processes, FIG. 5 describes an example implementation of the SSO 206 and JSO 204 on a computer system 200 with VM 110, including VM systems with 32-bit CPUs and VMM extensions 160. Processing begins at process 505, where the SSO 206 on one of the computer system's 200 CPUs, say CPU 210, receives memory region parameters 202 in the form of a start physical address, denoted as parameter EAX, and an end physical address, denoted as parameter ECX. Taken together, the addresses specified in the EAX and ECX parameters specify the region in memory 270 that is to be secured. The SSO 206 takes preparatory actions at process 510 to provide the required environment within which the SSO 206 will operate. The preparatory actions depend upon the architecture of the computer system 200 and may include, but are not limited to, insuring that the starting physical address, EAX, has a value that is less than the ending physical address, ECX. In addition, the SSO 206 can insure that the protected mode of the CPU 210 is enabled while the paging, physical address extension and VM extension modes are disabled, and that the privilege level of the CPU 210 is temporarily set to zero. Other possible preparatory actions might include disabling direct memory access (DMA) to the region or regions in memory 270 that is or are to be secured, i.e. the security kernel 275, and disabling hardware interrupts to the CPU 210. Disabling hardware interrupts helps to insure that the SSO 206 and JSO 204 are performed atomically. Most importantly, the SSO 206 provides the required environment for loading a trustable operating system by causing each of the other CPUs 220/230 to commence a JSO 204 in order to insure that all of the non-SSO CPUs are halted, and thereby prevented from interfering with the operation of the SSO 206.

Upon completion of the preparatory actions, the SSO 206 continues at process 515 to create a cryptographic hash 280 for the specified region in memory 270 starting at address EAX and ending at address ECX. When securing multiple regions in memory 270, process 515 is repeated until all secured regions, i.e. the entire security kernel 275 are included in the cryptographic hash 280. At process 520, the SSO 206 records the cryptographic hash 280 in a chipset register that functions as the hash digest 280. The SSO 206 continues at process 525 by inducing the CPU 210 to enter a known state, and further at process 530 by causing the CPU 210 to jump to the hashed (i.e. the secured) region in memory 270, i.e. the security kernel 275. The SSO 206 concludes at process 535, where the CPU 210 will be in the known induced state with all interrupts disabled, and the security kernel 275 will be secured.

Figure 6:
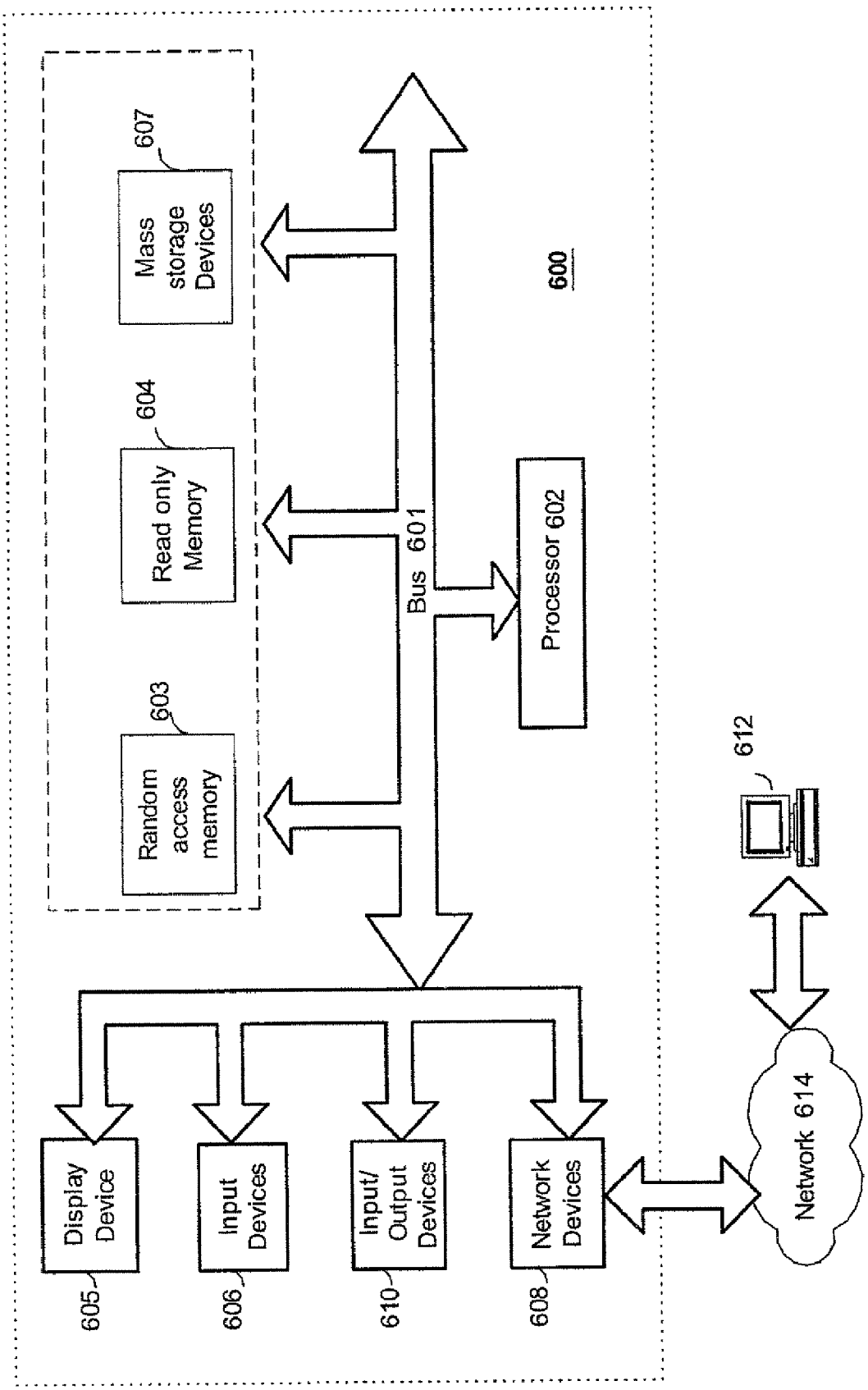
FIG. 6 is a block diagram illustrating one generalized embodiment of a computer system in which certain aspects of the invention illustrated in FIGS. 2-5 may be practiced.

FIG. 6 illustrates one embodiment of an general purpose computer system 600 in which one embodiment of the invention illustrated in FIGS. 2-5 may be practiced. One embodiment of the present invention may be implemented on a personal computer (PC) architecture. However, it will be apparent to those of ordinary skill in the art that alternative computer system architectures or other processor, programmable or electronic-based devices may also be employed.

In general, such computer systems as illustrated in FIG. 6 include one or more processors 602 coupled through a bus 601 to a random access memory (RAM) 603, a read only memory (ROM) 604, and a mass storage device 607. Mass storage device 607 represents a persistent data storage device, such as a floppy disk drive, fixed disk drive (e.g., magnetic, optical, magneto-optical, or the like), or streaming tape drive. Processor 602 represents a central processing unit of any type of architecture, such as complex instruction set computer (CISC), reduced instruction set computer (RISC), very long instruction word (VLIW), or hybrid architecture. In one embodiment the processors 602 are compatible with an Intel Architecture (IA) processor, such as the Pentium™ series, the IA-32™ and the IA-64™. In one embodiment, the computer system 600 includes any number of processors such as the CPUs 210/220/230 illustrated in FIG. 2.

Display device 605 is coupled to processor(s) 602 through bus 601 and provides graphical output for computer system 600. Input devices 606 such as a keyboard or mouse are coupled to bus 601 for communicating information and command selections to processor 602. Also coupled to processor 602 through bus 601 is an input/output interface 610 which can be used to control and transfer data to electronic devices (printers, other computers, etc.) connected to computer system 600. Computer system 600 includes network devices 608 for connecting computer system 600 to a network 614 through which data may be received, e.g., from remote device 612. Network devices 608, may include Ethernet devices, phone jacks and satellite links. It will be apparent to one of ordinary skill in the art that other network devices may also be utilized.

One embodiment of the invention may be stored entirely as a software product on mass storage 607. Another embodiment of the invention may be embedded in a hardware product, for example, in a printed circuit board, in a special purpose processor, or in a specifically programmed logic device communicatively coupled to bus 601. Still other embodiments of the invention may be implemented partially as a software product and partially as a hardware product.

When embodiments of the invention are represented as a software product stored on a machine-accessible medium (also referred to as a computer-accessible medium or a processor-accessible medium) such as mass storage device 607, the machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. Those of ordinary skill in the art will appreciate that other instructions and operations necessary to implement the described invention may also be stored on the machine-accessible medium. In one embodiment of the present invention, the machine-accessible medium includes instructions that when executed by a machine causes the machine to perform operations comprising the SSO 206 and JSO 204.

Accordingly, a novel method is described for loading a trustable operating system. From the foregoing description, those skilled in the art will recognize that many other variations of the present invention are possible. For example, when implementing the invention on a mainframe or comparable class of machine, it may not be necessary to disable direct memory access (DMA) to the region or regions in memory 270 that is or are to be secured, i.e. the security kernel 275, or to disable hardware interrupts to the CPU 210. On the other hand, when implementing the invention on a PC-architected machine, such additional protective mechanisms may be needed to provide an operating environment within which the invention may be practiced. Thus, the present invention is not limited by the details described. Instead, the present invention can be practiced with modifications and alterations within the spirit and scope of the appended claims.

What is claimed is:

1. A method of securing a region in a memory of a computer comprising:
   causing all but one of a plurality of processing elements in a computer to enter into a special halted state as part of a join secure operation;
   receiving a region parameter that identifies a region in a memory of the computer for use in trust measurement;
   using a signed cryptographic hash of the identified region to verify whether content in the identified region can be trusted;
   placing the non-halted processing element into a known privileged state; and
   after the non-halted processing element has been placed into the known privileged state, generating a signal that causes the processing elements associated with the special halted state to exit the special halted state and resume activity, wherein each of the plurality of processing elements associated with the special halted state exits the special halted state as part of the join secure operation, in response to a signal from the non-halted processing element indicating that a start secure operation is complete, and wherein the join secure operation is performed atomically.

2. The method of claim 1 further comprising:
causing the non-halted processing element to jump to a known entry point in the identified region in the memory.

3. The method of claim 1 further comprising:
causing at least one of the processing elements associated with the special halted state to jump to a known entry point in the identified region in the memory upon exiting the special halted state; and
wherein the signal that causes the processing elements associated with the special halted state to resume activity comprises a signal indicating that the non-halted processing element has completed initialization of trustable software.

4. The method of claim 1 wherein the region parameter specifies a location of the region to be used for trust measurement.

5. The method of claim 4 wherein
the location comprises a range of addresses in the memory of the computer within which the region is located.

6. The method of claim 4 wherein
the location comprises a start address and a length of the memory of the computer within which the region is located.

7. The method of claim 1 wherein the content is a component of an operating system to operate the computer.

8. The method of claim 7 wherein
the component of the operating system is one item from the group consisting of a virtual machine monitor and a privileged software nucleus.

9. The method of claim 1 further comprising:
blocking access to the identified region of the memory for a duration of time even after the processing elements associated with the special halted state have entered the special halted state when the plurality of processing elements are implemented within a computer system that supports direct memory access (DMA).

10. The method of claim 1 wherein:
the all but one of the plurality of processing elements enter into the special halted state in response to the join secure operation;
the operation of generating a signal that causes the processing elements associated with the special halted state to exit the special halted state and resume activity is performed by a start secure operation; and
the start secure operation is executed atomically with the join secure operation.

11. An apparatus comprising:
a plurality of processing elements; and
a memory comprising instructions to execute on the plurality of processing elements, wherein the instructions, when executed, cause the plurality of processing elements to perform operations comprising:
causing all but one of the plurality of processing elements to enter into a special halted state as part of a join secure operation;
receiving a region parameter that identifies a region in the memory for use in trust measurement;
using a signed cryptographic hash of the identified region to verify whether content in the identified region can be trusted;
placing the non-halted processing element into a known privileged state; and
after the non-halted processing element has been placed into the known privileged state, generating a signal that causes the processing elements associated with the special halted state to exit the special halted state and resume activity, wherein each of the plurality of processing elements associated with the special halted state exits the special halted state as part of the join secure operation, in response to a signal from the non-halted processing element indicating that a start secure operation is complete, and wherein the join secure operation is performed atomically.

12. The apparatus of claim 11 wherein the instructions further cause the non-halted processing element to perform operations comprising:
jumping to a known entry point in the identified region in the memory.

13. The apparatus of claim 11 wherein the instructions further cause the plurality of processing elements to perform operations comprising:
causing at least one of the processing elements associated with the special halted state to jump to a known entry point in the identified region in the memory upon exiting the special halted state; and
wherein the signal that causes the processing elements associated with the special halted state to resume activity comprises a signal indicating that the non-halted processing element has completed initialization of trustable software.

14. The apparatus of claim 11 wherein the region parameter specifies a location of the region to be used for trust measurement.

15. The apparatus of claim 14 wherein the location comprises a range of addresses in the memory.

16. The apparatus of claim 14 wherein the location comprises a start address and a length of the memory.

17. The apparatus of claim 11 wherein the content is a component of an operating system.

18. The apparatus of claim 17 wherein the component of the operating system is one item from the group consisting of a virtual machine monitor and a privileged software nucleus.

19. The apparatus of claim 11 wherein the instructions further cause the plurality of processing elements to perform operations comprising:
blocking access to the identified region of the memory for a duration of time even after the processing elements associated with the special halted state have entered the special halted state when the plurality of processing elements are implemented within a computer system that supports direct memory access (DMA).

20. The apparatus of claim 11 wherein:
the all but one of the plurality of processing elements enter into the special halted state in response to the join secure operation;
the operation of generating a signal that causes the processing elements associated with the special halted state to exit the special halted state and resume activity is performed by a start secure operation; and
the start secure operation is executed atomically with the join secure operation.

21. A computer program product comprising:
a non-transitory computer-readable storage medium; and
instructions in the non-transitory computer-readable storage medium, wherein the instructions, when executed in a computer, cause the computer to perform operations comprising:
causing all but one of a plurality of processing elements in the computer to enter into a special halted state as part of a join secure operation;

receiving a region parameter that identifies a region in a memory of the computer for use in trust measurement;

using a signed cryptographic hash of the identified region to verify whether content in the identified region can be trusted;

placing the non-halted processing element into a known privileged state; and after the non-halted processing element has been placed into the known privileged state, generating a signal that causes the processing elements associated with the special halted state to exit the special halted state and resume activity, wherein each of the plurality of processing elements associated with the special halted state exits the special halted state as part of the join secure operation, in response to a signal from the non-halted processing element indicating that a start secure operation is complete, and wherein the join secure operation is performed atomically.

22. The computer program product of claim 21 wherein the instructions further cause the computer to perform operations comprising:

causing the non-halted processing element to jump to a known entry point in the identified region in the memory.

23. The computer program product of claim 21 wherein the instructions further cause the computer to perform operations comprising:

causing at least one of the processing elements associated with the special halted state to jump to a known entry point in the region in the memory upon exiting the special halted state; and wherein the signal that causes the processing elements associated with the special halted state to resume activity comprises a signal indicating that the non-halted processing element has completed initialization of trustable software.

24. The computer program product of claim 21 wherein the region parameter specifies a location of the region to be used for trust measurement.

25. The computer program product of claim 24 wherein the location comprises a range of addresses in the memory of the computer within which the region is located.

26. The computer program product of claim 24 wherein the location comprises a start address and a length of the memory of the computer within which the region is located.

27. The computer program product of claim 21 wherein the content is a component of an operating system to operate the computer.

28. The computer program product of claim 27 wherein the component of the operating system is one item from the group consisting of a virtual machine monitor and a privileged software nucleus.

29. The computer program product of claim 21 wherein the instructions further cause the computer to perform operations comprising:

blocking access to the identified region of the memory for a duration of time even after the processing elements associated with the special halted state have entered the special halted state when the plurality of processing elements are implemented within a computer system that supports direct memory access (DMA).

30. The computer program product of claim 21 wherein:

the all but one of the plurality of processing elements enter into the special halted state in response to the join secure operation;

the operation of generating a signal that causes the processing elements associated with the special halted state to exit the special halted state and resume activity is performed by a start secure operation; and the start secure operation is executed atomically with the join secure operation.

* * * * *

UNITED STATES PATENT AND TRADEMARK OFFICE
CERTIFICATE OF CORRECTION

| | | |
|---|---|---|
| PATENT NO. | : 8,386,788 B2 | Page 1 of 1 |
| APPLICATION NO. | : 12/615475 | |
| DATED | : February 26, 2013 | |
| INVENTOR(S) | : Michael A. Kozuch et al. | |

It is certified that error appears in the above-identified patent and that said Letters Patent is hereby corrected as shown below:

In the Drawings:

On sheet 2 of 6, in figure 2, Reference Numeral 275, line 5, delete "KERNAL" and insert -- KERNEL --, therefor.

Signed and Sealed this
Fourteenth Day of May, 2013

Teresa Stanek Rea
*Acting Director of the United States Patent and Trademark Office*